(12) United States Patent
McDonald

(10) Patent No.: US 9,320,286 B1
(45) Date of Patent: Apr. 26, 2016

(54) APPARATUS AND METHOD FOR CLEANING GAME

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 0 days.

(21) Appl. No.: 14/550,195

(22) Filed: Nov. 21, 2014

(51) Int. Cl.
A22C 17/00 (2006.01)
A22C 17/08 (2006.01)
A22C 21/00 (2006.01)
A22C 25/02 (2006.01)

(52) U.S. Cl.
CPC ............. *A22C 17/08* (2013.01); *A22C 21/0061* (2013.01); *A22C 25/02* (2013.01)

(58) Field of Classification Search
CPC .................................. A22C 9/00; A22C 17/08
USPC .......... 452/173, 106, 119, 123; 119/200, 209, 119/211, 215, 217, 224, 232, 236, 245, 249, 119/252–254, 264, 269
See application file for complete search history.

(56) References Cited

U.S. PATENT DOCUMENTS

| | | | | |
|---|---|---|---|---|
| 1,956,524 A * | 4/1934 | Byram | ................. | A01K 63/003 119/245 |
| 2,860,371 A | 11/1958 | Krull | | |
| 2,966,159 A | 12/1960 | Ruegnitz | | |
| 3,452,966 A * | 7/1969 | Smolski | .............. | B01F 3/04517 119/200 |
| 3,916,777 A * | 11/1975 | Earl | ........................ | A22C 9/001 452/141 |
| 4,173,051 A | 11/1979 | Reid | | |
| 4,201,153 A * | 5/1980 | Nace | ....................... | A01K 63/00 119/200 |
| 4,726,095 A | 2/1988 | Bissell, Jr. | | |
| 4,763,386 A | 8/1988 | Wissbroecker | | |
| 4,876,768 A | 10/1989 | Bright | | |
| 5,129,855 A | 7/1992 | Bruckert et al. | | |
| 5,562,535 A * | 10/1996 | Puppolo | ................. | A61K 35/32 452/135 |
| 5,791,290 A * | 8/1998 | Mueller | ............... | A01K 61/008 119/218 |
| 5,938,519 A * | 8/1999 | Wright | .................... | A22C 21/04 452/173 |
| 6,443,100 B1 * | 9/2002 | Brenton | ................ | A01K 61/007 119/211 |
| 6,582,612 B1 * | 6/2003 | White | .................... | A01K 63/04 119/208 |
| 7,287,488 B2 * | 10/2007 | Taylor | .................. | A01K 61/007 119/200 |
| 7,363,878 B2 * | 4/2008 | McRobert | ............ | A01K 61/003 119/245 |
| 8,062,105 B2 * | 11/2011 | Aandewiel | ............... | A22B 5/12 452/74 |
| 2013/0093107 A1 | 4/2013 | Funderburg | | |
| 2014/0127986 A1 | 5/2014 | Cady | | |

* cited by examiner

*Primary Examiner* — Richard Price, Jr.
(74) *Attorney, Agent, or Firm* — Egbert Law Offices, PLLC

(57) ABSTRACT

An apparatus for cleaning game has a container with an interior volume defined by a wall and a pipe positioned in the container adjacent the wall. The pipe has at least one aperture suitable for directing a flow of water toward a portion of the wall spaced from the pipe such that the flow of water creates a cyclonic path in the container. The pipe extends generally vertically along the wall of the container. The pipe includes a plurality of apertures formed in spaced relation to each other along the length of the pipe. The pipe has a closed end positioned below an upper edge of the container.

17 Claims, 4 Drawing Sheets

APPARATUS AND METHOD FOR CLEANING GAME

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and methods for cleaning game. More particularly, the present invention relates to apparatus for separating debris from the meat of the game. More particularly, the present invention relates to methods and apparatus whereby feathers, scales and blood can be separated from the meat of the game.

2. Description of Related Art Including Information Disclosed Under 37 CFR 1.97 and 37 CFR 1.98

During the course of hunting, it becomes necessary to harvest the meat from the killed game. The game can be in the nature of birds, fish, deer, boars, and other commonly-hunted game. When the meat is harvested, the harvested meat is often tossed into a container, along with the associated debris, such as feathers, hair, blood, scales, and related debris. After the meat is collected in the container, the meat must be meticulously cleaned in order to separate the debris from the meat. This is a very time-consuming and difficult operation. As such, a need has developed so as to provide an apparatus and method so as to conveniently and efficiently separate the debris from the meat.

In particular, in the hunting of fowl, the bird is de-breasted so that the breast meat can be tossed into the container. The person harvesting the meat will often have feathers and blood on his or her hands. Whenever the harvested breast is tossed into the container, the feathers and blood will also be passed into the container. After all of the breasts, blood and feathers have been accumulated in the container, another operation is required to take each of the breasts from the container and meticulously clean the breast of blood and feathers. As a result, a clean bird breast is obtained.

In the case in which fish are the game that is being caught, the fillets of the fish are separated from the body of the fish and also tossed into the container. During the process of descaling the fish, residual scales and blood will reside on the hands of the person cleaning the fish. The scales and blood will be delivered, along with the harvested meat, into the container. Once again, a need has developed so as to be able to properly separate the meat of the fish from the scales and the blood.

In the past, various patents have issued relating to devices for cleaning game. For example, U.S. Pat. No. 2,860,371, issued on Nov. 18, 1958 to R. M. Krull, describes a fish cleaning device. This fish cleaning device includes a generally cylindrical housing. The housing has a plurality of longitudinal corrugations therein spaced around an upper compartment. An electric motor is mounted in the lower compartment and has a vertical shaft extending through the wall into the upper compartment. A scaling plate is mounted on the shaft in rotatable relationship therewith adjacent the wall in the upper compartment. The plate has a plurality of angularly spaced upwardly projecting generally radial ridges thereon so as to cause tumbling action in fish contained in the upper compartment.

U.S. Pat. No. 2,966,159, issued on Dec. 27, 1960 to R. C. Ruegnitz, describes an egg washing apparatus. This egg washing apparatus includes a container having an imperforate detachable cover and includes a Tchamber adapted to receive a liquid. A perforate basket supports eggs within the container and has a sleeve extending centrally therein above a horizontal plane defined by the upper rim of the basket. The basket is removably suspended within the chamber. An agitator is provided that includes a vertical shaft equipped with a plurality of elongated vertical blades. A motor is arranged with the agitator for rotating the agitator.

U.S. Pat. No. 4,173,051, issued on Nov. 6, 1979 to J. P. Reid, describes a vegetable washer for washing food articles. The washing apparatus includes a container for housing the food articles, an agitation system and washing system for removing undesired foreign materials from the surface of the food articles, and a discharge system.

U.S. Pat. No. 4,726,095, issued on Feb. 23, 1988 to Bissell Jr. et al., discloses a fish scaler device. The device includes a water bucket, an abrasive continuous surface within the bucket, and an agitator for water within the bucket. As the water is agitated, fish suspended within the bucket gently tumble against the abrasive surface and are thereby scaled. The abrasive surface is an inwardly dimpled bucket liner. The agitator is a rotatable impeller.

U.S. Pat. No. 4,763,386, issued on Aug. 16, 1988 the H. A. Wissbroecker, teaches a fish scaling apparatus that includes a container and a cylindrical insert including a plurality of inwardly-extending projections. The projections are provided with a rough or sharp edge. A paddle member is disposed within the interior of the cylindrical insert and is connected to a shaft extending exterior of the container. The shaft is adapted for connection to the chuck of a portable drill. When the drill is operated, the rotation of the paddle member occurs within the interior of the cylindrical insert. The rotation causes fish disposed within the interior of the cylindrical insert to come into contact with the inwardly-extending projections so as to remove the scales from the fish.

U.S. Pat. No. 4,876,768, issued on Oct. 31, 1989 the C. K. Bright, shows a fish scaler that includes a bucket. A perpendicularly extending rod is rotatably connected to the lid of the bucket. A scaling element is attached to the rod. A plurality of scaling protrusions are attached to the exterior of the scaling element. The rotation of the scaling element causes relative movement between the scaling protrusions and the suspended fish so as to remove the scales from the suspended fish.

U.S. Pat. No. 5,129,855, issued on Jul. 14, 1992 to Bruckert et al., describes a fish scaler apparatus that includes an exterior cylindrical container with an interior cylindrical insert. A central axle is directed through a lid of the container so as to accommodate a drill so as to permit the rotation of the axle. The axle includes a central conduit with exterior ports to effect the washing of the fish within the container. The ports are in fluid communication with a fluid source, such as a garden hose.

U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in to mix with water. This causes the meat float up from the bottom and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described having a conduit affixed to a wall thereof. The conduit can be connected to a source of water pressure such that water pressure is directed into the interior of the bucket so as to interact with the game within the interior of the bucket.

It is an object of the present invention to provide a method and apparatus for cleaning game that efficiently and effectively separates debris from the meat of the game.

It is another object of the present invention to provide an apparatus and method for cleaning game which serves to pressure wash the meat of the game.

It is still another object of the present invention to provide an apparatus and method for cleaning game which can effectively remove feathers and blood from the meat of fowl.

It is another object of the present invention to provide a apparatus and method for cleaning game that avoids the need to hand wash the meat.

It is still further object of the present invention provide a method and apparatus for cleaning game that effectively catches the debris after it has been removed from the meat.

These and other objects and advantages of the present invention will become apparent from a reading of the attached specification and appended claims.

BRIEF SUMMARY OF THE INVENTION

The present invention is an apparatus for cleaning game that comprises a container having an interior volume defined by wall and a pipe positioned in the container adjacent to the wall. The container has a base and an upper edge. The pipe has at least one aperture suitable for directing a flow of water toward a portion of the wall spaced from the pipe such that the flow of water creates a cyclonic path in the container.

The pipe extends generally vertically along the wall of the container. The pipe is closed at an upper end thereof. A connector is fluidically connected to the pipe adjacent the lower end of the pipe. The connector has a portion extending outwardly of the wall of the container. The connector specifically has a water hose connector thereon such that the pipe can be connected to a water hose. Also, the water hose can be releasably connected to the connector. The waters hose is suitable for passing water under pressure into the pipe. A fastener, such as a bolt or a screw, is affixed to the container and extends to the pipe so as to fixedly position the pipe adjacent to the wall of the container.

In the present invention, the pipe has a plurality of apertures formed in spaced relation to each other along a length of the pipe. A first set of apertures is directed in one direction toward a portion of the wall of the container adjacent to the pipe. A second set of apertures is directed toward a portion of the wall further from the pipe. Each of the apertures is canted at an angle approximately 30° to horizontal. The plurality of apertures include a slot formed through a wall thickness of the pipe. The slot communicates with an interior of the pipe. The slot has a length that is substantially greater than a length of the aperture. The closed end of the pipe is positioned below an upper edge of the container. The pipe has a lower end positioned in spaced relation above the base. A screen is positioned at the base and extends outwardly of the container. A seat is removably or pivotally positioned above the upper edge of the container.

The present invention is also a method for cleaning game the comprises the steps of: (1) placing meat and debris into a container such that the meat and debris resides at a bottom of the container; (2) introducing water into the container such that the water flows in a cyclonic path in the container and such that the meat and debris interact with the introduced water; (3) continually flowing water into the container such that the cyclonic path cause the debris to separate from the meat in the container; and (4) overflowing the water over an upper edge of the container such that the debris is carried out of the container over the upper edge.

In the method of the present invention, the container has a pipe extending generally vertically adjacent a wall of the container. The pipe has a plurality of apertures formed through a wall thickness of the pipe. The step of continually flowing includes directing water under pressure to the plurality of apertures and toward the wall of the pipe in a location spaced from the pipe. The step of directing includes forming a fan of the water from each of the plurality of apertures. The plurality of apertures are in spaced relation along a length of the pipe. A first set of the apertures is directed in a direction different than a direction of a second set of apertures. The method of continually flowing includes directing a plurality of jets of water respectively from the plurality of apertures so as to maintain the cyclonic path of the water in the container. The water is directed from the pipe in a direction corresponding to a chord of a circumference of the container. The water can be screened after the water and the debris overflows the upper edge of the container such that the debris is separated from the water.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
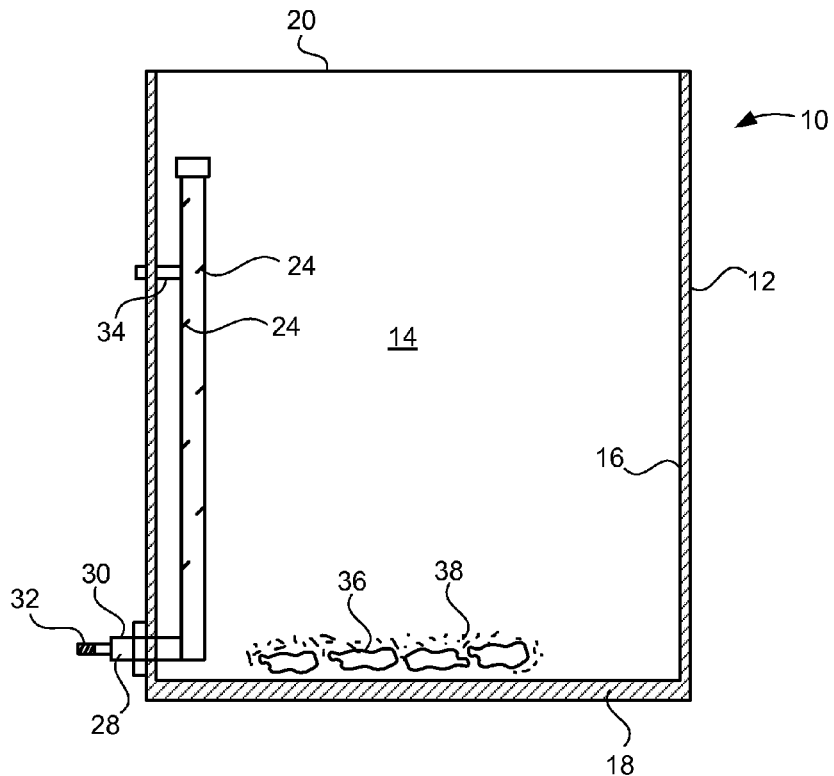
FIG. 1 is a cross-sectional side view showing the apparatus of the present invention.

Referring to FIG. 1, there is shown apparatus 10 for the cleaning of game. As used herein, the term "game" can include fowl, fish, and other wildlife. The apparatus 10 includes a container 12 having an interior volume 14. The interior volume 14 is defined by an inner wall 16. The container 12 also includes a base 18 and an upper edge 20. A pipe 22 is positioned in the container 12 adjacent to the inner wall 16. The pipe 22 has at least one aperture 24 suitable for directing a flow of water toward a portion of the wall 16 spaced from the pipe 22 such that the flow of water creates a cyclonic path of the water in the container 12.

In FIG. 1, the pipe 22 extends generally vertically along the inner wall 16 the container. The pipe 24 has a closure 26 at the upper end thereof. As such, all of the water that enters the interior of the pipe 22 will be directed outwardly of the pipe 22 through the apertures 24. A connector 28 is fluidically connected to the pipe 22 adjacent a lower end of the pipe 22. The connector 26 has a portion 30 that extends outwardly of the container 12. The connector 28 also has a water hose connector 32 thereon such that the pipe 22 can be connected to a water hose. Suitable fittings can be associated with the connector 28 so as to establish a liquid-tight seal for the connector through the wall of the container 12. A fastener 34, such as a bolt or a screw, is affixed to the pipe 22 and is affixed to the container 12 so as to fixedly position the pipe 22 adjacent the inner wall 16 of the container 12. Within the concept of the present invention, more than one pipe could be utilized.

As can be seen in FIG. 1, the meat 36 and the debris 38 has been introduced through the opening at the upper edge 20 of the container 12. The meat 36 and the debris 38 will initially reside at the base 18 of the container 12. In normal use, for example, as a bird is de-breasted, the breast meat, along with associated loose feathers and blood will be dropped through the opening at the upper edge 20 of the container 12 so as to reside at the base 18. In this manner, the meat, feathers and blood of the bird can be accumulated within the container 12. Prior to the present invention, a later process would be required so as to clean the meat 36 so as to effectively remove the loose feathers and blood from the meat 36. This process would be very time-consuming and labor intense. As such, the present invention was developed so as to allow for the cleaning of the meat 36 and the separation of the debris 38 from the meat 36 in a rapid and efficient manner.

Figure 2:
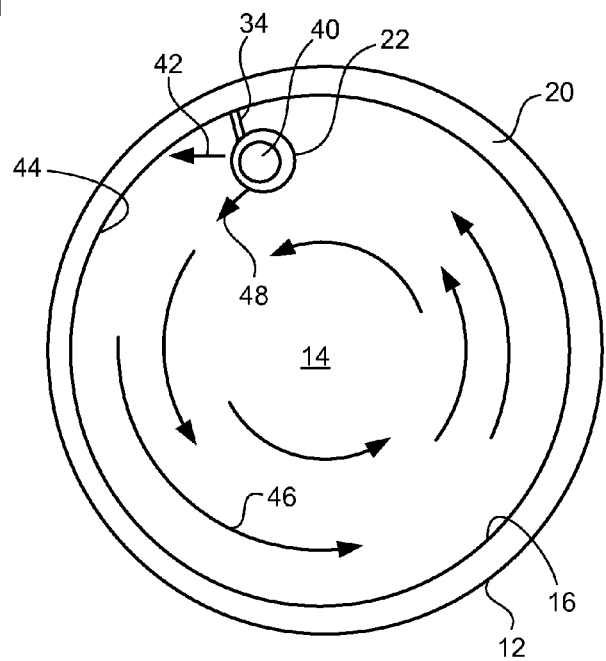
FIG. 2 is a cross-sectional plan view showing the apparatus of the present invention.

FIG. 2 illustrates a plan view of the container 12 and showing the upper edge 20 of the container. The container 12 has an inner wall 16 that defines the interior volume 14 of the container. In FIG. 2, it can be seen that the pipe 22 is affixed by fastener 34 to the inner wall 16 of the container 12.

Importantly, in FIG. 2, it can be seen that the water is directed from the interior 40 of the pipe 20 outwardly through the apertures 24. As such, the water will flow outwardly of the pipe 22 in a first direction through a first set of apertures and will be directed in a second direction from a second set of apertures. The water flow 42 is directed toward a portion 44 of the inner wall 16 of the container in spaced relationship to the pipe 22. The water flow 43 is directed from the second set of apertures outwardly of the pipe 22 also toward another portion of the inner wall 16 of the container 12. In particular, the water flow 42 is directed to the portion of the wall 16 of the container 12 generally adjacent to the pipe 22. The water flow 43 is directed toward a portion of the wall 16 in a location spaced further from the pipe 22 and spaced from the portion of the wall associated with the water flow 42. The direction 42 is generally a chord of a circumference of the container 12. By flowing the water in the first direction, a cyclonic path of water flow (illustrated by arrows 46) is created in the interior 14 of the container 12. The cyclonic path of water flow 42 serves to effectively separate the debris 38 from the meat 36. The first set of apertures 24 of the pipe 22 will distribute the jets of water over a substantial portion of the height of the container 12. This has been found to enhance the strength of the cyclonic flow path into create an improved washing effect. The water flow 43 from the second set of apertures of the pipe 22 provides a broader flow which serves to agitate the water within the container 12 further and to pressure wash the meat within the container. As such, the combined water flows 42 and 43 serve to substantially increase the turbulence within the container for the purpose of separating the debris from the meat. The water flow 42 creates the cyclonic flow path while the water flow 43 agitates the water flows and pressure washes the meat simultaneously. As such, these water flows 42 and 43 combine to enhance the ability of the present invention to effectively clean the meat and remove debris from the meat.

Figure 3:
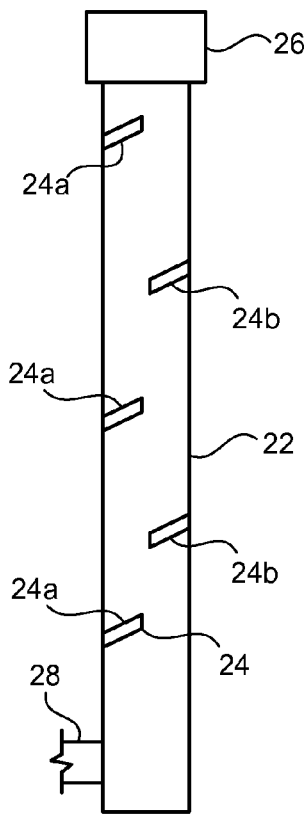
FIG. 3 is an isolated view showing the pipe as used in the apparatus of the present invention.

FIG. 3 illustrates the configuration of the pipe 22. It can be seen that the apertures 24 are formed through the wall thickness of the pipe 22. A closure 26 is located at the top of the pipe 22 so as to effectively close the top of the pipe. The connector 28 is located at the bottom of the pipe 22 so as to allow the introduction of water into the interior 40 of the pipe 22. Importantly, within the concept of the present invention, the connector 22 can be at any location along the length of the pipe 22.

In FIG. 3, it can be seen that each of the apertures 24 is in the nature of a slot. The apertures 24 are positioned in spaced parallel relationship to each other along the length of the pipe 22. A first set of apertures 24a will extend in one direction along a portion of the pipe 22 generally adjacent to the wall 16 of the container 12. A second set of apertures 24b are positioned on the pipe 22 away from the first set of apertures 24a. The second set of apertures 24b are directed further away from the wall of the container 16 than the apertures 24a. In the preferred embodiment of the present invention, there are a total of three apertures 24a. There are two apertures 24b. The apertures 24b are interposed longitudinally between the adjacent pairs of the apertures 24a. As such, this is configured to establish a broad fan-style of spray of water flow from the pipe 22. It can be seen that each of the first set of apertures 24a and the second set of apertures 24b are canted at an approximately 30° angle to horizontal. Once again, this angled relationship of each of the apertures 24a and 24b is configured so as to create the optimal cyclonic water flow path and pressure washing. This slotted type of aperture 24, as opposed the holes, or other types of openings, is intended to create a fan of water as it is ejected under pressure from each of the apertures 24. However, within the concept of the present invention, the apertures 24 can also include holes, openings, and similar techniques for releasing the water under pressure from the pipe 22. Additionally, spray-type fittings could be placed within the holes formed in the pipe 22. It is believed that the fan-shape flow of water greatly facilitates the pressure washing of the meat that enhances the creation of the cyclonic path of the water flow. Additionally, such a fan-type of spray further serves to distribute the pressurized water over a greater area than would be the release of water through the use of a simple circular hole pattern.

Figure 4:
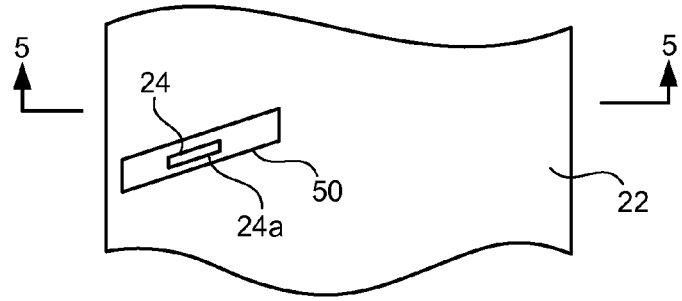
FIG. 4 is a close-up view showing the slot as formed in the pipe of the apparatus of the present invention.

FIG. 4 illustrates the construction of a single aperture 24, and in particular, aperture 24a as located within the slot 50. In experiments with the present invention, it was found that the apertures 24 can be made in a rapid, efficient and effective manner by simply using a saw set to cut the PVC pipe 22. The saw can be set so as to cut the slot 50 to a prescribed depth. Since the pipe 22 has a known wall thickness, the slot 50 is cut through the wall thickness so as to expose the aperture 24. The aperture 24 is exposed so as to have a greater length than a width. As can be seen, the aperture 24 is of an elongated nature. As such, this will cause a fan-type spray pattern. Additionally, the inner walls the slot 50 will also constrain the release of water into such a fan-type pattern and also, through fluid dynamics, enhance the force of the water as it is emitted through the aperture 24.

FIG. 4 further shows that the slot 50 has been cut so as to be canted at approximately a 30° angle with respect to horizontal. Once again, this angling of the aperture 24 and the slot 50 further enhances the wide-area spray-type flow pattern. Aperture 24b will have a similar configuration to aperture 24a.

Figure 5:
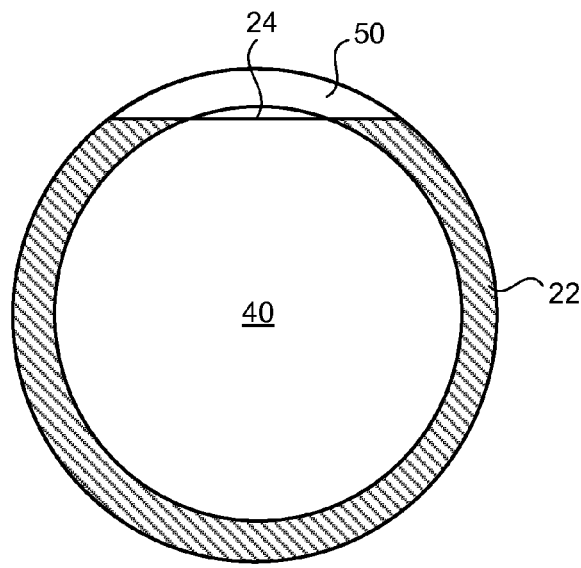
FIG. 5 is a cross-sectional view showing the slot as formed through the wall thickness of the pipe of the apparatus of the present invention.

FIG. 5 illustrates the construction of the slot 50 and the aperture 24 in a view taken across lines 5-5 of FIG. 4. As can be seen, the slot 50 is simply formed by cutting through the pipe 22 with a chop saw. As such, a relatively linear aperture 24 is formed when the depth of the cut enters the interior 40 of the pipe 22. As a result, water can be released through the aperture 24 and restrained and directed by the wall created by the formation of the slot 50.

Figure 6:
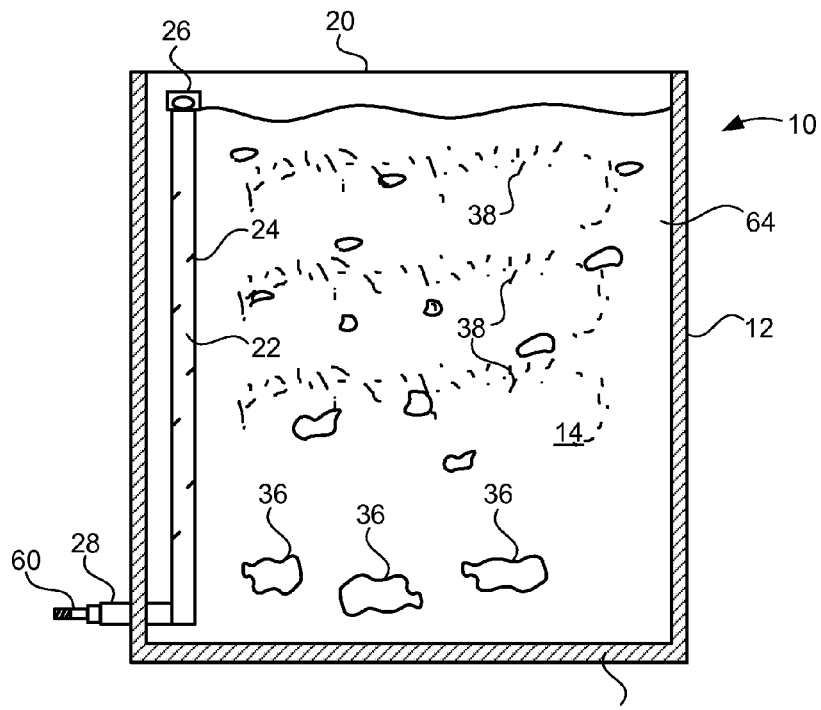
FIG. 6 is a cross-sectional view of the apparatus the present invention showing an intermediate step in the method of the present invention.

FIG. 6 shows an intermediate step in the method of the present invention. In FIG. 6, the apparatus 10 includes the container 12 and the pipe 22 in the manner described herein previously. A garden hose 60 is connected to the connector 28. As such, the water hose 60 can deliver water under pressure through the connector 28 and into the interior of the pipe 22. In FIG. 6, it can be seen that the pipe 22 has a closure 26 at an upper end thereof. Ultimately, the upper end of the pipe 22 should be disposed below the upper edge 20 of the container 12. When the cyclonic water path is created in the manner described herein previously, the extension of the pipe 22 above the upper edge 12 would restrict the dispersion of the debris and the release of the debris. In other words, the cyclonic path of the flow of the debris would encounter the upper end of the pipe 22 and tend to clump and gather in such an area. As such, within the concept of the present invention, the upper end of the pipe 22 should be disposed a certain distance below the upper edge 20 of the container 12.

In FIG. 6, it can be seen that water has been introduced through the apertures 24 of the pipe 22 into the interior 14 of the container 12. The introduction of the water in the cyclonic flow path illustrated in FIG. 2 causes the meat 36 to generally tumble in the area adjacent to the base 18 of container 12. The fan-type flow of water from the pipe 22 will serve to pressure-wash the tumbling meat 36. Additionally, the debris 38, in the nature of feathers and blood, will tend to move upwardly toward the upper edge 20 of the container 10. This is because the debris 38 is generally less dense than water and less dense than the meat 36. The cyclonic flow of water within the container 12 also serves to urge the debris 38 upwardly. When the debris 38 is in the nature of blood, the continual flow of water into the interior 14 of the container 12 will continually dilute the blood within the container. The blood will mix with the water and be discharged in the manner shown in FIG. 7.

Figure 7:
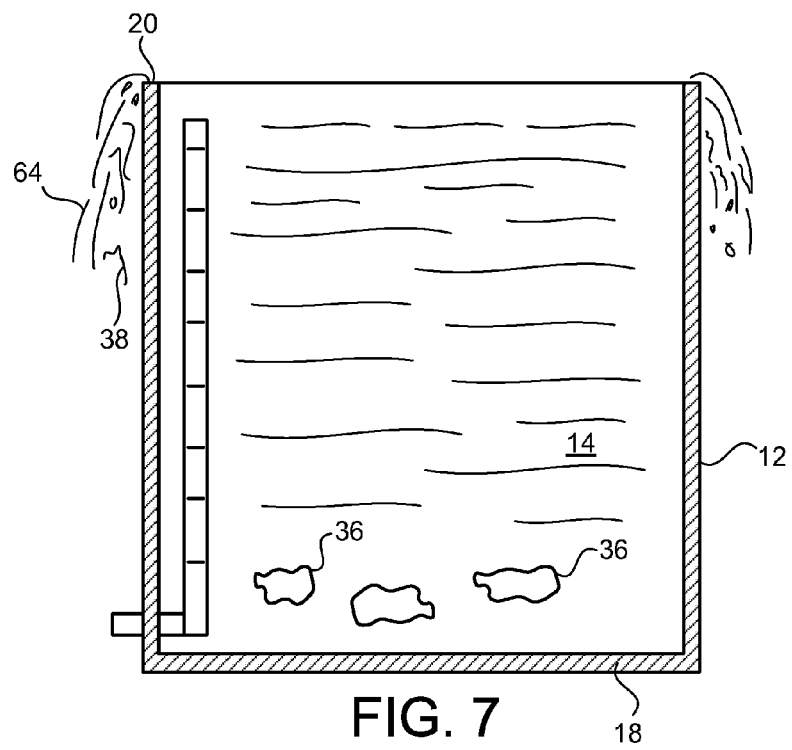
FIG. 7 is a cross-sectional view of the apparatus the present invention showing a later step in the method of the present invention.

In FIG. 7, it can be seen that after a certain amount of time, the meat 36 will reside adjacent to the base 18 of the container 12. The water 64 from the interior 14 of the container 12 overflows the upper edge 20 of the container 12. This overflow will serve to discharge the debris 38 outwardly of the container 12. Ultimately, after a period of time, the blood will continue to dilute until only clear water resides within the interior 14 of the container 12. After the debris 38 has been discharged over the upper edge 20 of the container 12, and after the blood has become sufficiently dilute, the water flow can be turned off and the meat 36 removed from the interior 14 of container 12. The meat will be very clean and suitable for use without further treatment. As such, the system of the present invention avoids the requirement for meticulously washing the breast after it is harvested from the bird or meticulously washing the meat of the fish. It is believed that the process of the present invention can effectively clean the meat 36 in a short period of time.

Figure 8:
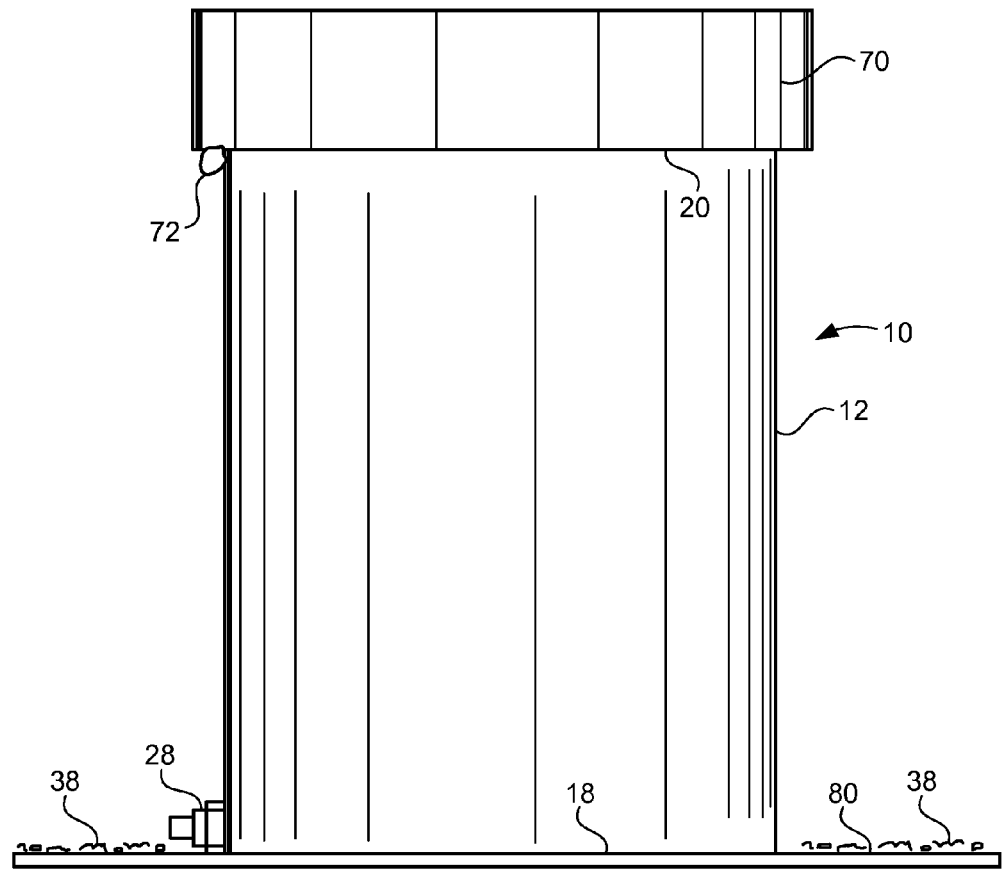
FIG. 8 is a side elevational view of the apparatus of the present invention and showing, in particular, a screen and a seat associated with the container.

FIG. 8 shows the exterior view of the container 12 of the apparatus 10 of the present invention. In FIG. 8, it can be seen that the container 12 has a generally cylindrical construction. The connector 28 is illustrated as located adjacent to the base 18 of the container 12. Importantly, a seat 70 can be placed onto the upper edge 20 of the container 12. The seat 70 can take any number of forms, as already known. In particular, a suitable insert can be applied into the interior of the container 12 such that the seat 12 can be pivotally connected by a hinge 72. As such, this construction allows the seat to be pivoted upwardly so as to allow access to the interior of the container 12. Alternatively, the seat 70 can simply be lifted from the container 12 so that the interior of the container 12 is exposed.

In FIG. 8, it can further be seen that there is a screen 80 that it is located adjacent to the base 18 of the container 12. The screen 80 extends outwardly of the exterior of the container 12. The screen 80 is provided so as to catch the debris 38 after it is washed from the interior 14 of the container 12. In certain circumstances, users do not desire to have feathers, and other debris, residing in an area adjacent to the apparatus 10. As such, the screen 80 is provided so as to collect the debris 38 thereon. As a result, the water will pass through the screen 80 while the debris 38 is collected on the top surface of the screen 80. Various manual techniques can then be employed so as to simply dispose of the debris 38 after it is collected on the top surface of the screen 80.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for cleaning game, the apparatus comprising:
  a container having an interior volume defined by a wall, said container having a base and an upper edge;
  a pipe positioned in said container adjacent said wall, said pipe having at least one aperture suitable for directing a flow of water toward a portion of said wall spaced from said pipe such that said flow of water creates a cyclonic path in said container, said pipe extending generally vertically along said wall of said container, said pipe being closed at an upper end thereof; and
  a connector fluidically connected to said pipe adjacent a lower end of said pipe, said connector having a portion extending outwardly of said wall of said container.

2. The apparatus of claim 1, said connector having a water hose connector thereon such that said pipe can be connected to a water hose.

3. The apparatus of claim 1, further comprising:
  a water hose releasably connected to said connector, said water hose suitable for passing water under pressure into said pipe.

4. The apparatus of claim 1, said pipe having a plurality of apertures formed in spaced relation to each other along a length of said pipe.

5. The apparatus of claim 1, said closed end of said pipe positioned below said upper edge of said container.

6. The apparatus of claim 1, further comprising:
a screen positioned at said base and extending outwardly of said container.

7. The apparatus of claim 1, further comprising:
a seat removably or pivotally positioned above said upper edge of said container.

8. An apparatus for cleaning game, the apparatus comprising:
a container having an interior volume defined by a wall, said container having a base and an upper edge;
a pipe positioned in said container adjacent said wall, said pipe having at least one aperture suitable for directing a flow of water toward a portion of said wall spaced from said pipe such that said flow of water creates a cyclonic path in said container, said pipe having a plurality of apertures formed in spaced relation to each other along a length of said pipe, said plurality of apertures comprising:
a first set of apertures formed in said pipe so as to be directed toward a first portion of said wall of said container generally adjacent said pipe; and
a second set of apertures formed in said pipe so as to be directed toward a second portion of said wall of said container, said second portion of said wall of said container being further from said pipe than said first portion of said wall of said container, each of said plurality of apertures is a slot that is canted at approximately 30° with respect to horizontal.

9. The apparatus claim 8, the apertures of said second set of apertures being positioned between adjacent pairs of apertures of said first set of apertures.

10. The apparatus of claim 8, said slot having a length substantially greater than a length of the aperture.

11. A method of cleaning game comprising:
placing meat and debris into a container such that the meat and debris resides at a bottom of said container;
introducing water into said container such that the water flows in a cyclonic path in said container, said meat and debris interacting with the introduced water;
continually flowing water into said container such that the cyclonic path causes the debris to separate from the meat in said container; and
overflowing the water over an upper edge of said container such that the debris is carried out of said container over said upper edge.

12. The method of claim 11, said container having a pipe extending generally vertically adjacent a wall of said container, said pipe having a plurality of apertures formed through a wall of said pipe, said step of continually flowing comprising:
directing water under pressure through said plurality of apertures toward the wall of said container at a location spaced from said pipe.

13. The method of claim 12, the step of directing comprising:
forming a fan of water from each of said plurality of apertures.

14. The method of claim 12, the plurality of apertures being in spaced relation along a length of said pipe, the method of continually flowing comprising:
directing a plurality of jets of water respectively from said plurality of apertures so as to maintain the cyclonic path of the water in the container.

15. The method of claim 12, the step of directing water under pressure comprising:
directing the water from the pipe in a direction corresponding to a chord of a circumference of said container.

16. The method of claim 11, the debris being blood and feathers.

17. The method of claim 11, further comprising:
screening the water after the water and the debris overflows the upper edge of said container such that the debris is separated from the water.

\* \* \* \* \*